(12) United States Patent
Dorenbosch

(10) Patent No.: US 6,697,614 B2
(45) Date of Patent: Feb. 24, 2004

(54) METHOD AND APPARATUS FOR DISTRIBUTED ARBITRATION OF A RIGHT TO SPEAK AMONG A PLURALITY OF DEVICES PARTICIPATING IN A REAL-TIME VOICE CONFERENCE

(75) Inventor: Jheroen P Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 472 days.

(21) Appl. No.: 09/796,900

(22) Filed: Feb. 27, 2001

(65) Prior Publication Data

US 2002/0119795 A1 Aug. 29, 2002

(51) Int. Cl.[7] .......................... H04M 3/42; H04L 12/16
(52) U.S. Cl. ..................... 455/416; 455/518; 455/520; 455/415; 370/260
(58) Field of Search .......................... 455/414.4, 517, 455/518, 519, 509, 520, 416, 415, 515; 370/260, 261, 262, 264, 265, 270, 352, 401, 312, 328, 329

(56) References Cited

U.S. PATENT DOCUMENTS

| | | | |
|---|---|---|---|
| 5,436,896 A | | 7/1995 | Anderson et al. ............. 370/62 |
| 5,859,663 A | * | 1/1999 | Simon .................... 379/202.01 |
| 6,418,125 B1 | * | 7/2002 | Oran .......................... 370/266 |
| 6,477,150 B1 | * | 11/2002 | Maggenti et al. ........... 370/312 |
| 6,564,261 B1 | * | 5/2003 | Gudjonsson et al. ....... 370/261 |
| 6,574,469 B1 | * | 6/2003 | Xiang et al. ................ 455/416 |

* cited by examiner

*Primary Examiner*—Nay Maung
*Assistant Examiner*—John J Lee
(74) *Attorney, Agent, or Firm*—R. Louis Breeden

(57) ABSTRACT

An agent (100) is associated with each of a plurality of devices (201–204) for arbitrating between a talk stream generated by the device and a listen stream intended for the device and generated by another device on a network (210). In the agent a "Talk Mode" (300) is defined in which the agent passes the talk stream from the device to other devices participating in the conference while blocking all listen streams intended for the device, and a "Listen Mode" (400) is defined in which the agent blocks the talk stream of the device from the network and passes a single listen stream from the network to the device. The agent makes a decision to enter one of the Talk Mode and the Listen Mode, wherein the decision is based upon a presence of at least one of the talk stream and the listen stream, and wherein the decision is further based upon a comparison of source identifiers of the talk and listen streams when required to resolve a conflict.

25 Claims, 6 Drawing Sheets

METHOD AND APPARATUS FOR DISTRIBUTED ARBITRATION OF A RIGHT TO SPEAK AMONG A PLURALITY OF DEVICES PARTICIPATING IN A REAL-TIME VOICE CONFERENCE

FIELD OF THE INVENTION

This invention relates in general to wireless communication systems, and more specifically to a method and apparatus for distributed arbitration of a right to speak among a plurality of devices participating in a real-time voice conference through a network via multimedia data packets having source identifiers.

BACKGROUND OF THE INVENTION

Voice "chat" and voice conferencing can put high traffic loads on an internet protocol (IP) network. Voice over IP uses the well-known Real Time Protocol (RTP) to send voice data packets between participants. Most of the time only one person is speaking and the RTP traffic is reasonable. However, when multiple participants speak at the same time, the network traffic increases tremendously. This can saturate the network and result in unintelligible speech. The unintelligible speech then further adds to the confusion.

A prior art solution has been the use of a centralized entity such as a conference bridge. The conference bridge hears all participants, but transmits only one selected participant. This solution complicates call setup and is expensive. It also does not reduce the load of the voice data from all participants coming into the conference bridge. The problem becomes even more serious in a wireless system. When several participants speak at the same time the amount of traffic for a single participant easily surpasses the capacity of the wireless channel to the participant. Several prior-art solutions are available. One is the insertion of a mixer in the wireless infrastructure. Another is the construction of a centralized dedicated controller, such as the Dispatch Application Processor (DAP) in the well-known iDEN dispatch system. The iDEN DAPs make sure that at any time only one participant can speak.

Because centralized solutions are expensive and do not scale well, what is needed is a distributed solution to limit the amount of voice conference data that is allowed to enter the network. Preferably, the solution will allow only one speaker at a time to have the right to speak.

DETAILED DESCRIPTION OF THE DRAWINGS

Figure 1:
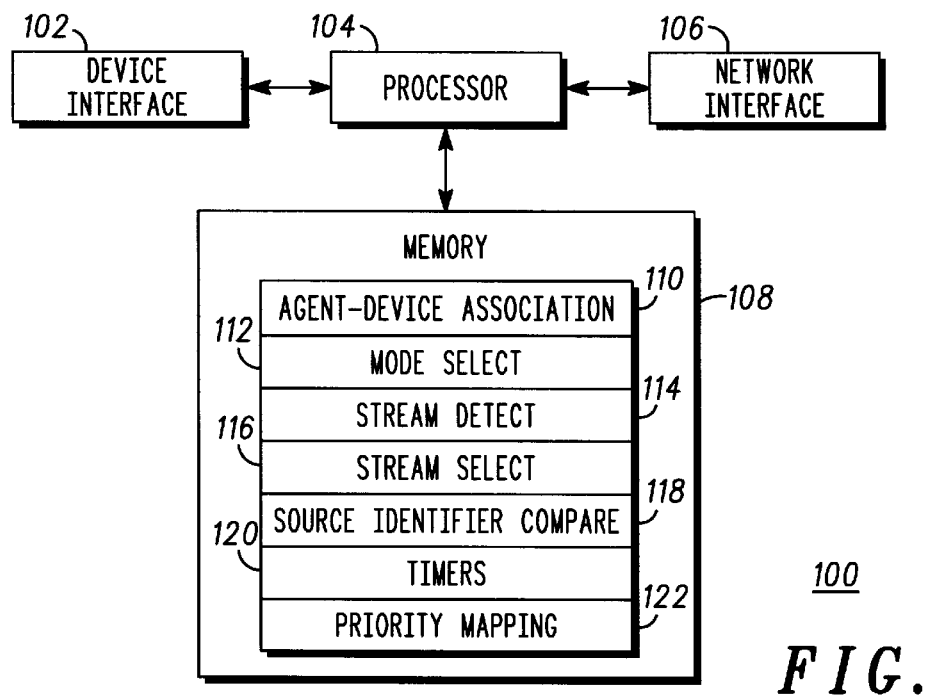
FIG. 1 is an exemplary electrical block diagram of an apparatus in accordance with the present invention.
Figure 2:
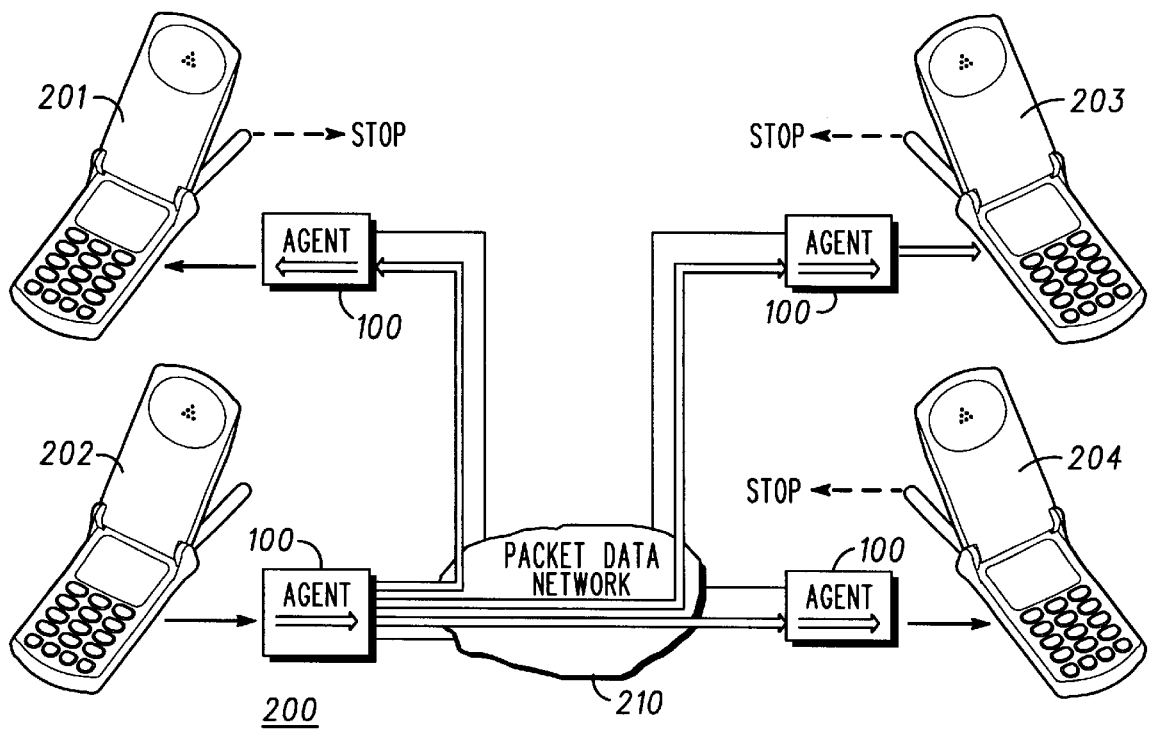
FIG. 2 is an exemplary diagram depicting voice data flow through a network in accordance with the present invention.

Referring to FIG. 1, an exemplary electrical block diagram depicts an apparatus 100 in accordance with the present invention. The apparatus 100 comprises a device interface 102 for communicating with a device, such as a mobile station (MS) 201 (FIG. 2). The apparatus 100 further comprises a network interface 106 for communicating with other devices 202–204 (FIG. 2) through a network 210 (FIG. 2). In addition, the apparatus 100 includes a processor 104 coupled to the device interface 102 and coupled to the network interface 106 for controlling communications through the device interface and the network interface. The apparatus 100 also includes a memory 108 coupled to the processor 104 for storing software for programming the processor 104 in accordance with the present invention. It will be appreciated that, alternatively, the processor 104 and the memory 108 can be manufactured as a single integrated component, as well. Indeed, the entire apparatus 100 alternatively can be manufactured as a single integrated component, if desired.

The memory 108 comprises an agent-device association program 110 for programming the processor 104 to act as an agent associated with the device 201 for arbitrating between a talk stream generated by the device and a listen stream intended for the device and generated by another device 202–204 on the network. The memory 108 further comprises a mode select program 112 for programming the processor 104 to define in the agent a "Talk Mode" in which the agent passes the talk stream from the device to the other devices participating in the conference while blocking all listen streams intended for the device, and a "Listen Mode" in which the agent blocks the talk stream of the device from the network and passes a single listen stream from the network to the device. The mode select program 112 also programs the processor 104 to make a decision to enter one of the Talk Mode and the Listen Mode, wherein the decision is based upon a presence of at least one of the talk stream and the listen stream, and wherein the decision is further based upon a comparison of source identifiers of the talk and listen streams when required to resolve a conflict. Streams will be used to carry the voice data of each participant. A stream that carries voice information is called a non-silent stream. Depending on the vocoder being used, when the participant stops speaking, the stream is either interrupted, or the vocoder produces "silent" packets that can represent background noise.

The memory 108 further comprises a stream detect program 114 for programming the processor 104 to detect the presence of a non-silent talk stream from the device 201 as well as a non-silent listen stream intended for the device. The memory 108 also includes a stream select program 116 for programming the processor 104 to select either the talk stream or one of the listen streams as the stream to pass, while blocking all others, in accordance with the present invention. In addition, the memory 108 includes a source identifier compare program 118 for programming the processor 104 to compare the source identifiers of the talk and listen streams to determine the highest priority stream. The memory 108 further comprises a plurality of timer programs 120 for programming the processor 104 to keep track of timing functions utilized in accordance with the present invention. The memory 108 also includes a priority mapping program 122 for programming the processor 104 to map the source identifiers into priority levels, according to predetermined rules. Because the apparatus 100 is arranged and programmed to act as an agent on behalf of its associated device, the apparatus 100 will also be referred to herein as the agent 100. Operation of the agent 100 will now be described in further detail.

Referring to FIG. 2, an exemplary diagram 200 depicts voice data flow through a network in accordance with the present invention. The diagram 200 comprises devices 201–204, preferably mobile stations, e.g., cellular telephones. The wireless link of each device 201–204 is coupled through an associated agent 100 to a packet data network 210, e.g., a cellular infrastructure having packet data capability. All agents 100 use substantially the same algorithm. The algorithm is constructed such that the agents 100 do not need to exchange explicit information related to floor control. Each agent 100 limits the number of voice streams allowed into the network. It will be appreciated that, alternatively, the devices 201–204 can comprise wired devices. For a wired device, such as a PC, IP telephone, etc., the agent 100 preferably resides inside the device 201–204 itself. With wireless devices the agent 100 can reside in the MS, but preferably resides in the infrastructure. This advantageously limits the over-the-air (OTA) traffic. It will be appreciated that in one embodiment the device 201–204, alternatively, can be a device, e.g., a conference bridge, which itself performs an arbitration of a right to speak for a plurality of separate devices, e.g., telephone sets. In that embodiment, the device 201–204 preferably provides a single talk stream into the agent 100, and receives a single listen stream from the agent 100. During operation, the agent 100 preferably runs in one of five Modes: Talk, Listen, Idle, Converge-Talk, and Converge-Listen. The need for, and operation of each of the five Modes will now be described.

Figure 3:
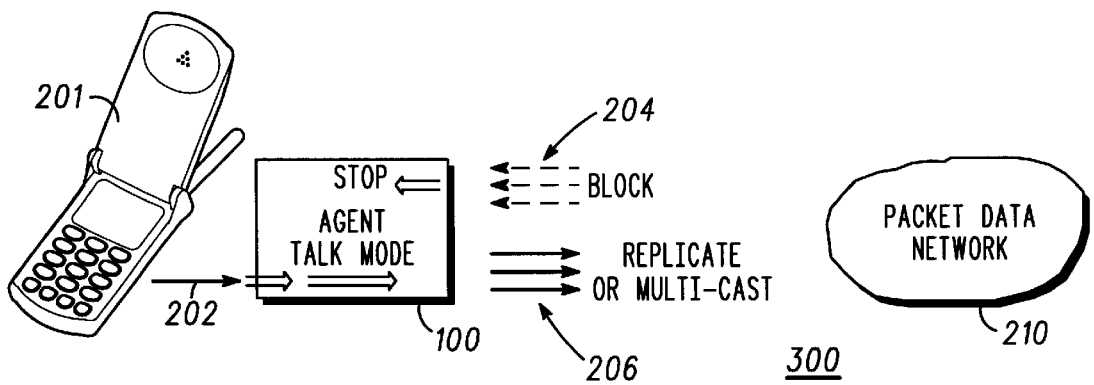
FIG. 3 is an exemplary diagram depicting voice data flow through an agent in Talk Mode in accordance with the present invention.

FIG. 3 is an exemplary diagram 300 depicting voice data flow through the agent 100 in Talk Mode in accordance with the present invention. In Talk Mode the agent 100 receives, for example, an RTP stream from the associated device 201 (the 'talk' stream 202) and sends the RTP stream to the other participants in the conference. The agent 100 blocks all listen streams 204 to the device 201. The agent 100 preferably identifies selected streams through a well-known synchronization source identifier (SSRC) in the RTP header. The agent 100 can do the replication of the voice packets 206 for multiple participants, which reduces OTA load, or use IP multicast, to also reduce network load.

Figure 4:
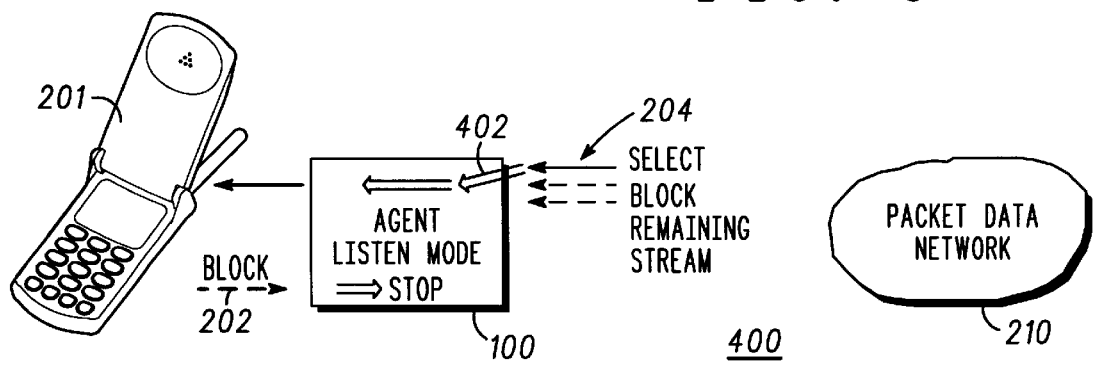
FIG. 4 is an exemplary diagram depicting voice data flow through the agent in Listen Mode in accordance with the present invention.

FIG. 4 is an exemplary diagram 400 depicting voice data flow through the agent 100 in Listen Mode in accordance with the present invention. In Listen Mode the agent 100 blocks the talk stream of the associated device 201 and passes exactly one 402 of the incoming 'listen' streams to the device 201.

Figure 5:
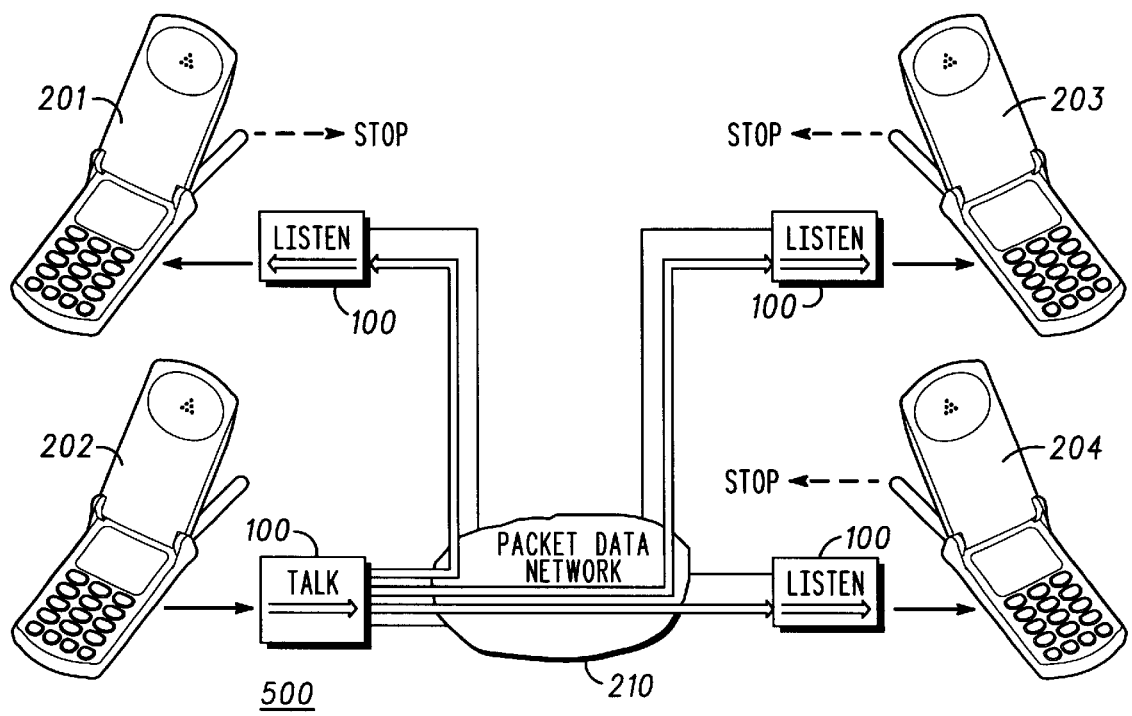
FIG. 5 is an exemplary diagram depicting voice data flow and operation of the agent in accordance with the present invention.

FIG. 5 is an exemplary diagram 500 depicting voice data flow and operation of the agent 100 in accordance with the present invention. The algorithm of the agent 100 is arranged such that normally there is only one agent 100 in Talk Mode at a given time, while the other agents 100 participating in the conference are in Listen Mode.

Figure 6:
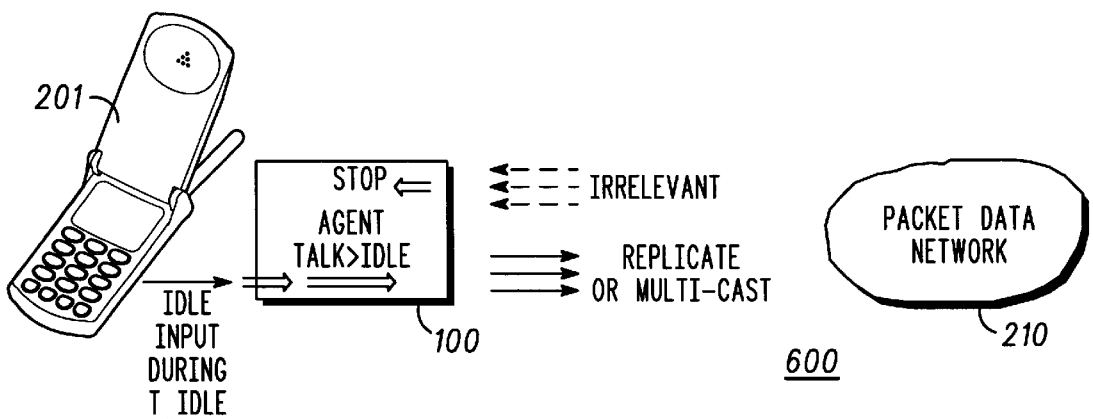
FIG. 6 is an exemplary diagram depicting operation of the agent as it transitions from Talk Mode to Idle Mode in accordance with the present invention.
Figure 7:
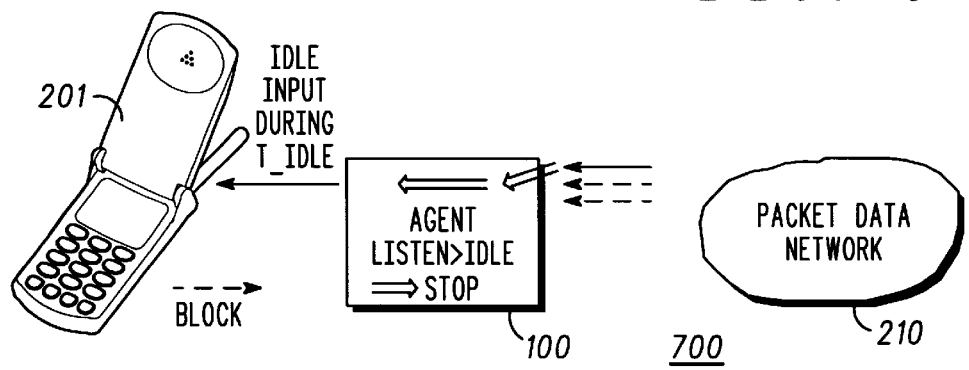
FIG. 7 is an exemplary diagram depicting operation of the agent as it transitions from Listen Mode to Idle Mode in accordance with the present invention.

FIGS. 6 and 7 are exemplary diagrams 600, 700 depicting operation of the agent 100 as it transitions from Talk Mode and Listen Mode, respectively, to Idle Mode in accordance with the present invention. The agent 100 uses a timer to define when a selected stream stops sending voice: when for a duration of t_idle, an agent 100 does not receive packets of the selected stream or receives only packets that encode silence, the agent 100 transitions to Idle Mode. All agents 100 preferably use the same value for t_idle. Note that with this mechanism one can not interrupt a speaker that does not pause for t_idle. In a conference the selected speaker will sooner or later stop speaking. All agents 100 will then go to Idle Mode and another participant may take a turn speaking. In a crude solution to the problem, each Idle Mode agent 100 could give the floor to the first speaker from which it receives a RTP stream.

Figure 8:
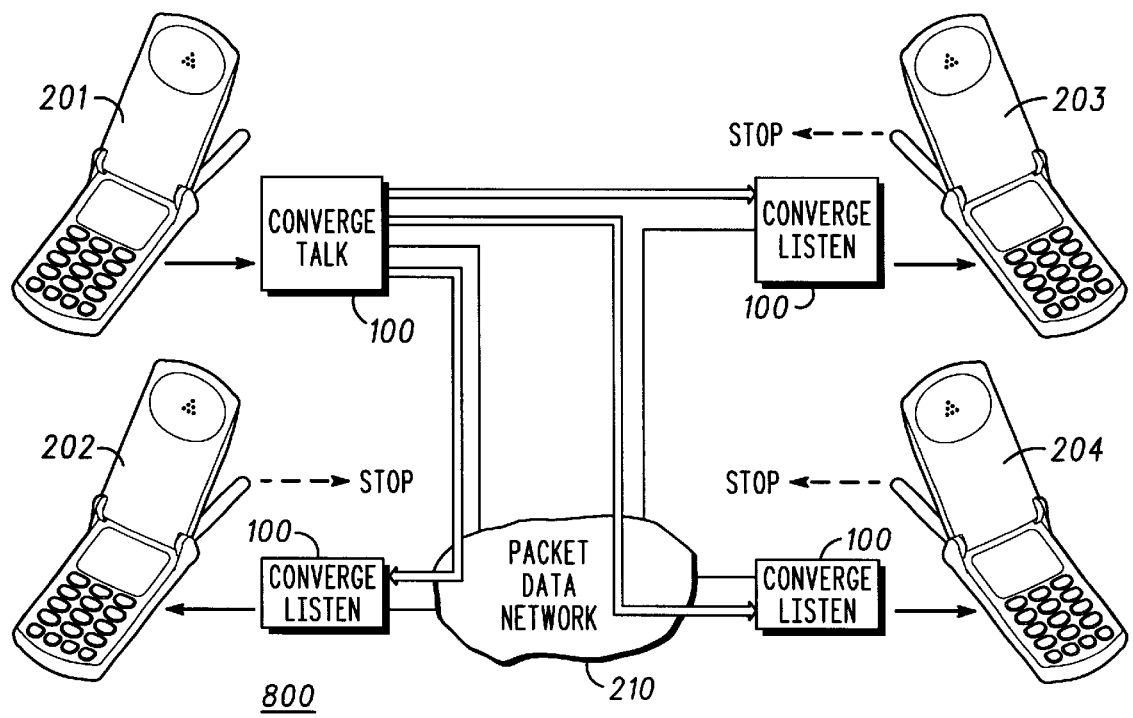
FIG. 8 is an exemplary diagram depicting voice data flow through the network in accordance with the present invention.
Figure 9:
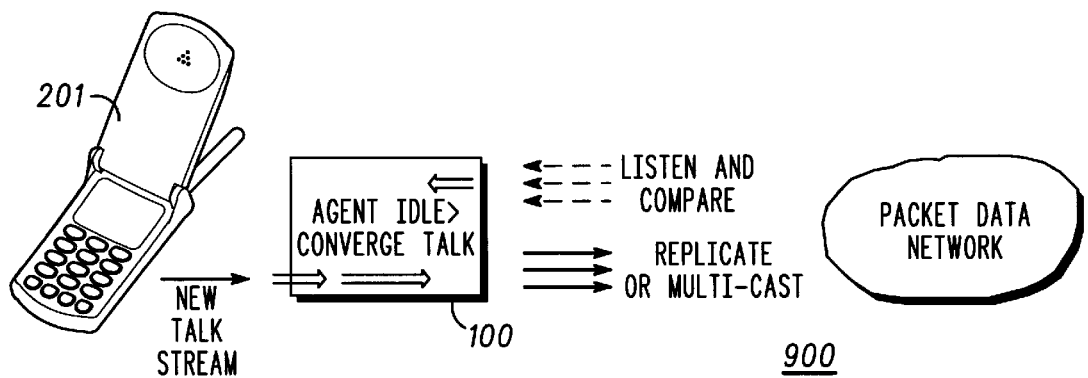
FIG. 9 is an exemplary diagram depicting operation of the agent as it transitions from Idle Mode to Converge-Talk Mode in accordance with the present invention.
Figure 10:
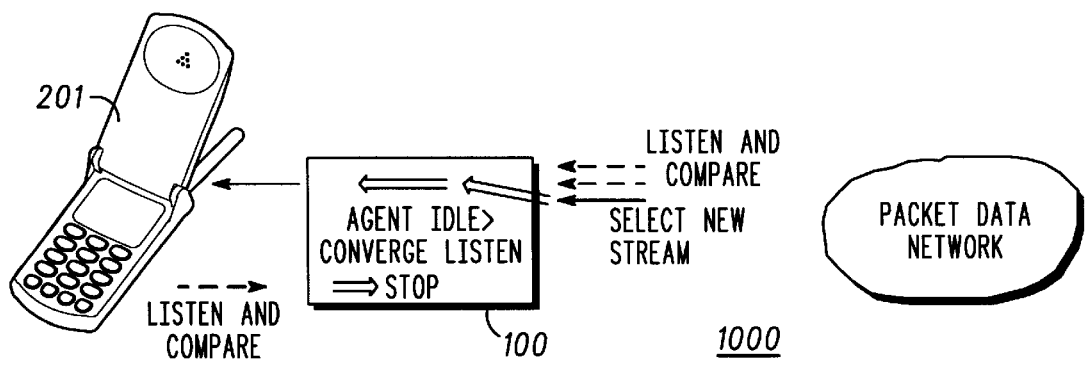
FIG. 10 is an exemplary diagram depicting operation of the agent as it transitions from Idle Mode to Converge-Listen Mode in accordance with the present invention.

It is easy to imagine that this leads to problems when two participants speak up at the same time (due to differential delays through the packet data network). For this reason the agents 100 preferably do not go directly from Idle Mode to Talk Mode or Listen Mode. When an agent 100 becomes Idle, it listens to all possible streams to detect a non-silent one. When a non-silent stream is detected, the agent 100 preferably goes through a convergence period of duration t_converge. All agents 100 preferably use the same value for t_converge. When the first detected stream comes from the agent's associated device 201, the agent 100 transitions to Converge-Talk Mode; when the first detected stream is directed to the device 202–204, the agent 100 transitions to Converge-Listen Mode, as depicted in FIGS. 8 to 10. During a Converge Mode, the agent 100 looks for additional non-silent streams.

One or more non-silent streams may already be present when the agent 100 transitions to Idle Mode. If there is only one such stream, the agent 100 directly transitions to Converge-Talk or Converge-Listen Mode, as appropriate. However, when more than one non-silent stream is present, the agent 100 preferably is able to predictably pick one. Preferably all agents will pick the same stream. Therefore all agents use a common prioritization method:

A listen stream towards the device 201–204 associated with the agent 100 always has priority over a talk stream from the associated device 201–204.

Prioritization among multiple listen streams is based on the source identifier of the stream, e.g., the SSRC in the header of the stream. A primitive—but quite acceptable—version of prioritization simply picks the stream with the highest SSRC.

During the Converge Modes, the agents 100 look for a more appropriate stream and, upon finding one, switch to it. To limit network traffic the selection algorithm preferably is biased against talkers.

In Converge-Listen Mode (FIG. 10) the agent 100 blocks the talk stream from the associated device 201–204 as long as a listen stream towards the associated device 201–204 is present. However, the agent 100 also continuously looks for new listen streams. It will select the listen stream with the highest priority (based on the source identifier) and switch to it as soon as it has been observed. When the t_converge timer runs out while the agent is in Converge-Listen Mode, the agent goes to Listen Mode. If t_idle is shorter than t_converge, the agent 100 can also transition to Idle Mode. If the listen stream stops for t_presence and no other listen stream is present, a talk stream can take over. The use of t_presence is explained further below. The agent 100 would then transition to the Converge-Talk Mode.

In Converge-Talk Mode (FIG. 9) the agent continuously looks for new listen streams. If the agent 100 detects a listen stream towards the associated device 201–204 with a priority that is higher than that of the talk stream, the agent 100 immediately switches to the listen stream and transitions to the Converge-Listen Mode. Preferably, the t_converge timer is not reset. When the t_converge timer runs out while the agent is in the Converge-Talk Mode, the agent 100 transitions to the Talk Mode. It will be appreciated that, because a stream consists of discrete data packets, the presence or absence of a stream needs to be defined. A reasonable definition is that a stream preferably is considered present as long as a non-silent packet belonging to the stream (based on the source identifier) has been received during the preceding period of length t_presence. All agents 100 preferably use the same value for t_presence. Preferably, t_presence is selected to be equal to or greater than three times the normal packet inter-arrival time for a non-silent stream. This will prevent a small number of missed or delayed packets for misleading the agent 100. It will be appreciated that, alternatively, other values can be selected for t_presence as well, depending on the network 210.

Figure 11:
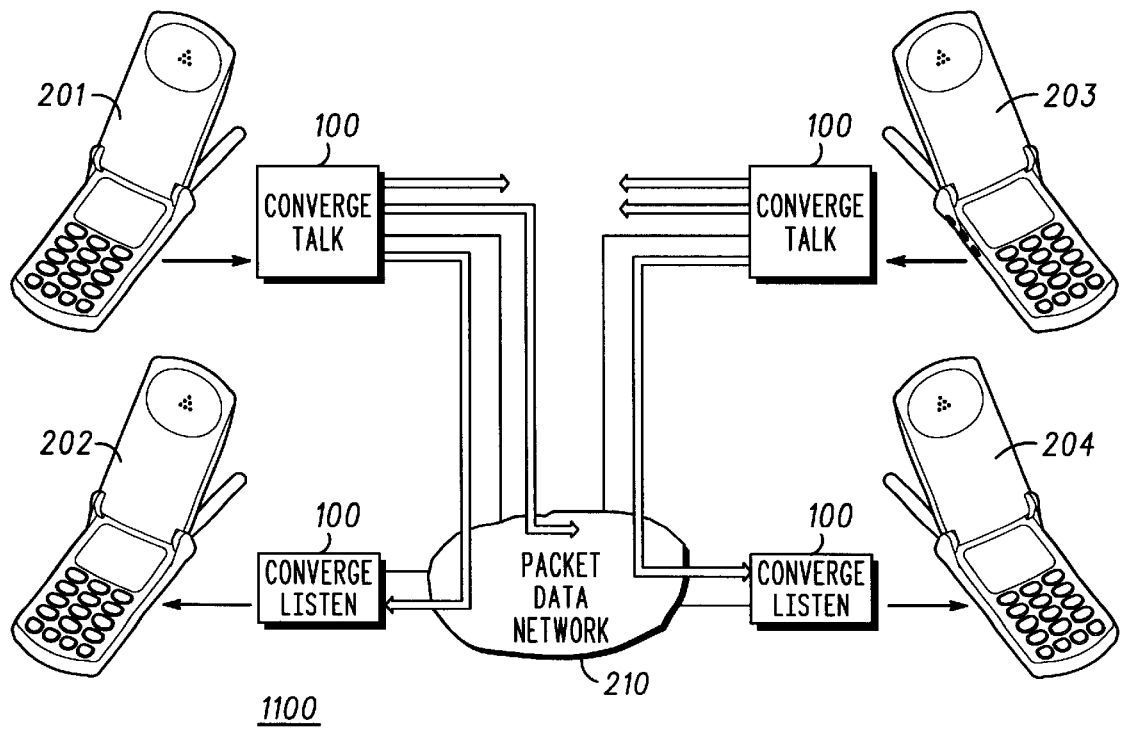
FIGS. 11–13 are exemplary diagrams depicting operation of a four-way conference in accordance with the present invention, when two participants start to speak at about the same time.
Figure 12:
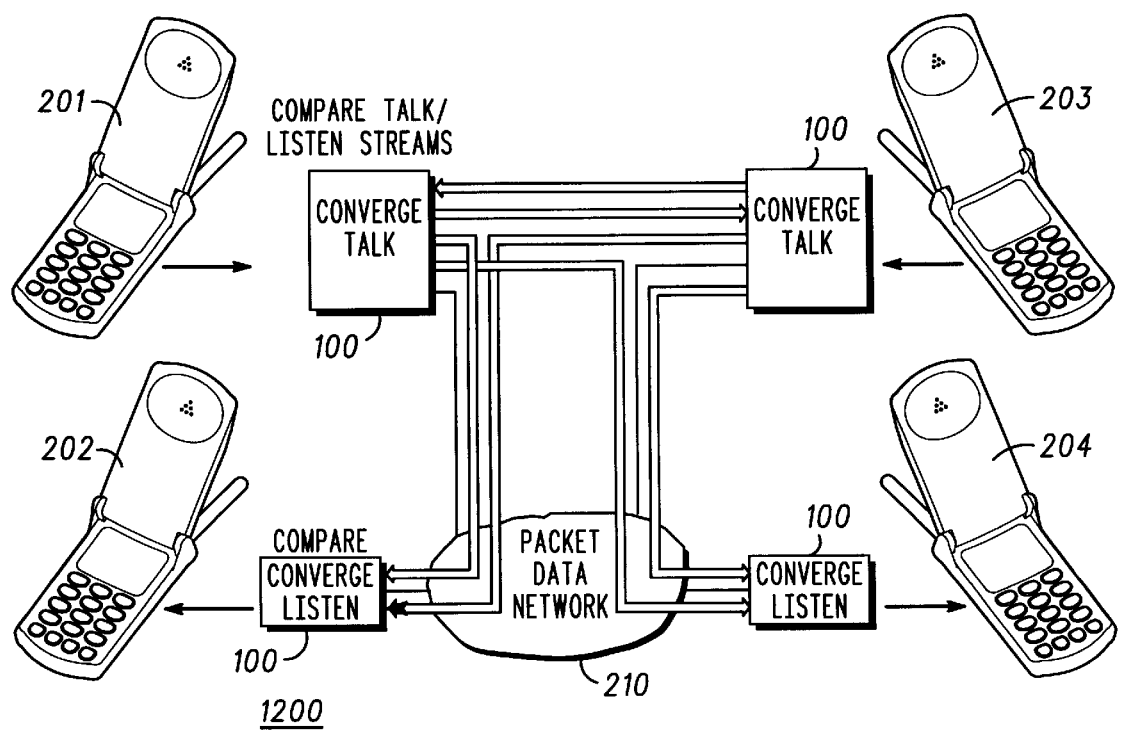
Figure 13:
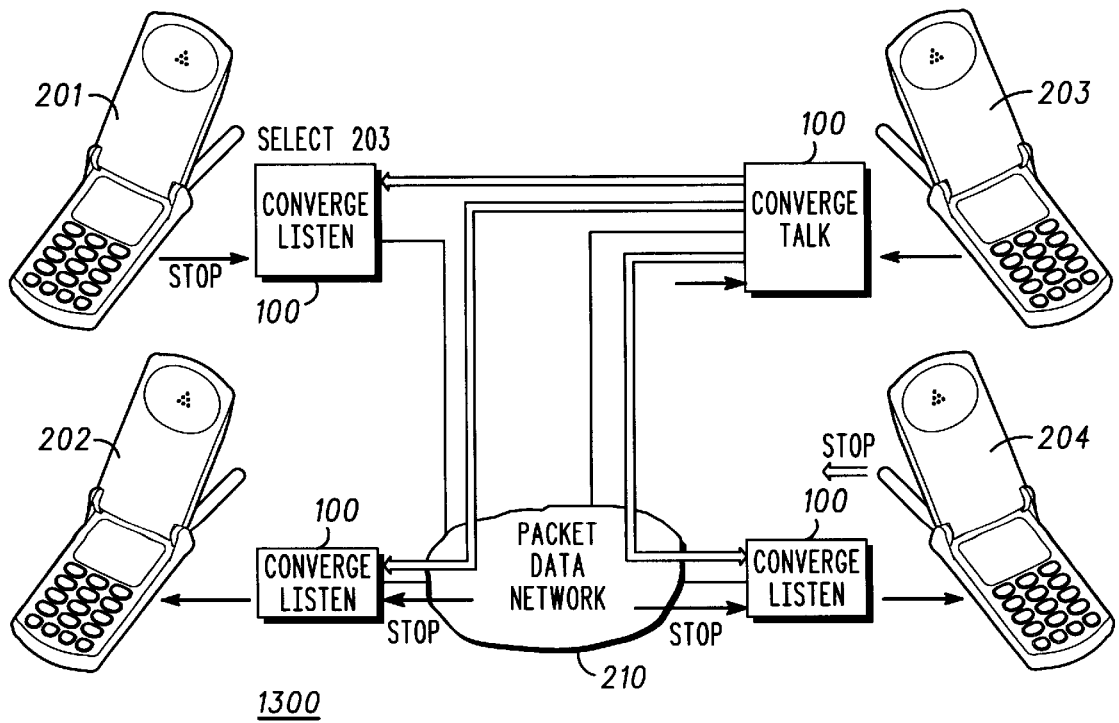

FIGS. 11–13 are exemplary diagrams 1100–1300 depicting operation of a four-way conference in accordance with the present invention, when two participants start to speak at about the same time. It is assumed that the priority of device 203 is higher than that of device 201.

At the start of the example, all agents are in the Idle Mode. The participants using devices 201 and 203 start to talk at the same time. As depicted in the diagram 1100, the agents 100 associated with the devices 201 and 203 will transition to the Converge-Talk Mode and will copy their talk streams onto the network 210. The agent 100 associated with the device 202 receives the stream from the device 201 first, transitions to the Converge-Listen Mode, and passes the stream from the device 201 to the device 202. Similarly the agent 100 associated with the device 204 passes the stream from the device 203.

Referring to the diagram 1200, the stream from 203 now reaches the agents for 201 and 202, and the stream from 201 reaches the agents for 203 and 204. Agents 100 for 202 and 204 are in the Converge-Listen Mode. They receive streams from 201 and 203. Both will select the stream from 203 because it has higher priority. Agents 100 associated with 201 and 203 are in Converge-Talk Mode and compare the newly received stream from 203 with their currently selected (talk) streams.

The agent 100 associated with 201 finds that the new stream from 203 has higher priority, blocks its talk-stream, switches to the stream from 203, and transitions to the Converge-Listen Mode. The agent 100 associated with 203 finds that the new stream from 201 has lower priority and will block it. The agent 100 will stay in Converge-Talk Mode.

Referring to the diagram 1300, agents associated with 201, 202 and 204 are now in Converge-Listen mode. Soon there will be no more data from 201 on the network. Agents of 202 and 204 will also block any talk streams from their devices, even if their devices have a higher priority than the device 203. Note that this method advantageously is very robust. Even if for some reason the agent 100 of 202 would not have selected the stream from 203, the stream from 201 would soon have dried out. That would the force the agent 100 of 202 to switch to the stream from 203 anyway.

Figure 14:
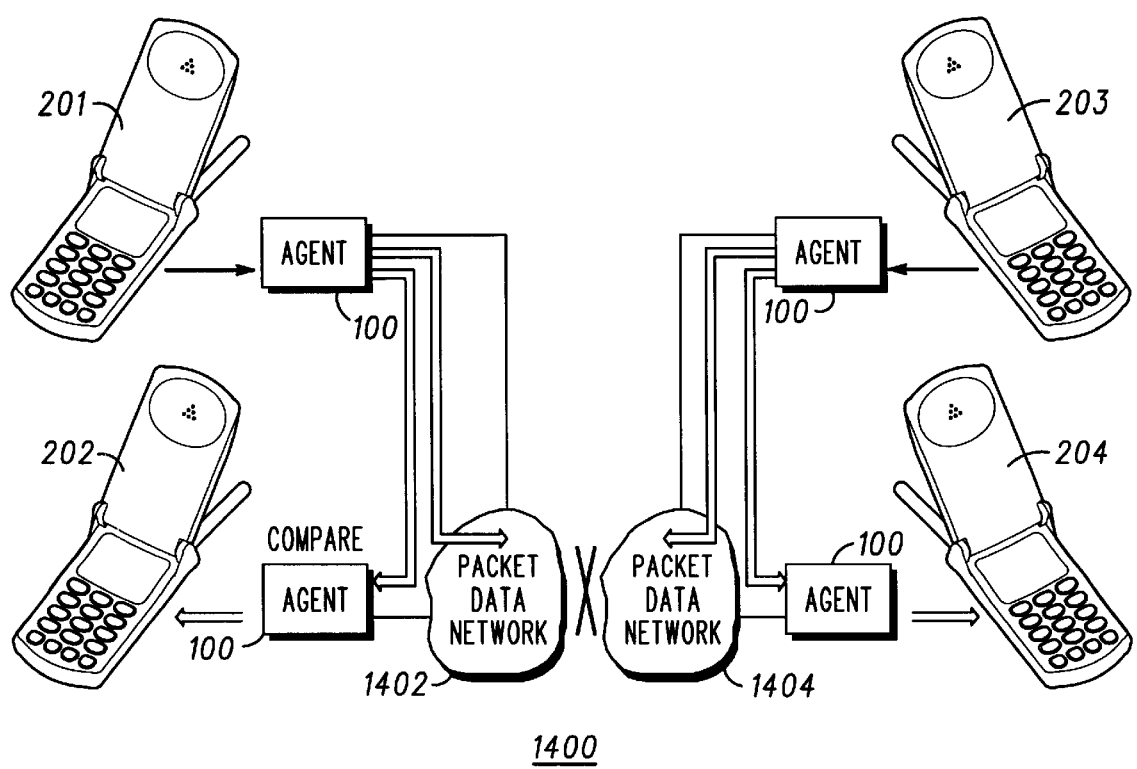
FIG. 14 is an exemplary diagram depicting operation of the four-way conference in accordance with the present invention, when the network becomes separated into two networks.

FIG. 14 is an exemplary diagram 1400 depicting operation of the four-way conference in accordance with the present invention, when the network 210 becomes separated into two networks 1402, 1404. Another sign of robustness is that the conference is self-organizing. If, for example, the network 210 gets cut into two separate areas, each area will be able to continue its conference with a limited set of participants. When the network connection is restored later on, the conference will reconnect automatically after one area has an idle period.

One of ordinary skill in the art will recognize that there can be many variations on the prioritization algorithm. As a first alternative example, during call setup the participants can agree on the relative priorities of the devices participating in the conference. The participants can then either assign SSRC values accordingly, or inform the agents 100 of the SSRC priority scheme.

As a second alternative example, to avoid that some users always have higher priorities, one can change the prioritization algorithm such that user prioritization rotates. For example, if all agents are time-synchronized, one can make them add, modulo 2^32, different numbers from a suitable range of pseudorandom offset numbers to each SSRC (assuming a 32-bit SSRC). Each agent can then derive its offset each minute. Alternatively one can make each agent use a one-way hash function that inputs the time value and the SSRC of a stream to derive a new, scrambled identifier for the stream. The agent would then prioritize competing streams using the scrambled identifiers.

As a third alternative example, to provide the equivalent of a dispatcher that can always barge in, one can instruct all agents 100 to always give priority to a stream with the SSRC of the dispatcher. When the dispatcher then starts to talk, its agent 100 would go into Talk Mode and transmit the stream on the network 210. Other agents 100 would then go to Listen Mode and switch to the dispatcher's stream as soon as they observe its SSRC.

As a fourth alternative embodiment, the present invention can be used in a multimedia (voice and video) conference. In such a multimedia conference it will be appreciated that it will be advantageous for the agent 100 to switch the video along with the voice, such that the speaker who currently has the right to speak also can be seen on video by the other participants.

It will be appreciated that there can be simpler alternative embodiments which use fewer Modes. For example, in one alternative embodiment the agents 100 can use the t_presence and t_idle timers and only the Converge-Talk, Converge-Listen, and Idle Modes. When no non-silent streams are present, the agent 100 simply waits in the Idle Mode for a stream to show up. The disadvantage of this embodiment is that it provides a less stable floor control. The use of the additional Talk and Listen Modes makes it more difficult to interrupt a speaker who has the floor.

It should be clear from the preceding disclosure that the present invention provides a method and apparatus which provides a distributed solution to limit the amount of voice conference data that is allowed to enter a network. Advantageously, the method and apparatus allow only one speaker at a time to have the right to speak. A further advantage is that the distributed architecture of the present invention is economical for small networks, and it scales well for large networks.

Many modifications and variations of the present invention are possible in light of the above teachings. Thus, it is to be understood that, within the scope of the appended claims, the invention can be practiced other than as specifically described herein above.

What is claimed is:

1. A method for distributed arbitration of a right to speak among a plurality of devices participating in a real-time voice conference through a network via multimedia data packets having source identifiers, the method comprising the steps of:

associating an agent with each of the plurality of devices for arbitrating between a talk stream generated by the device and a listen stream intended for the device and generated by another device on the network;

defining in the agent a "Talk Mode" in which the agent passes the talk stream from the device to other devices participating in the conference while blocking all listen streams intended for the device, and a "Listen Mode" in which the agent blocks the talk stream of the device from the network and passes a single listen stream from the network to the device; and making a decision, by the agent, to enter one of the Talk Mode and the Listen Mode, wherein the decision is based upon a presence of at least one of the talk stream and the listen stream, and wherein the decision is further based upon a comparison of the source identifiers of the talk and listen streams when required to resolve a conflict.

2. The method of claim 1, wherein the device is a mobile telephone, and wherein the agent is located in a mobile telephone infrastructure coupled wirelessly with the mobile telephone.

3. The method of claim 1, further comprising in the device the steps of:

performing an arbitration of a right to speak for a plurality of separate devices;

providing a single talk stream into the agent; and receiving a single listen stream from the agent.

4. The method of claim 1, further comprising in the agent the step of:

entering an "Idle Mode" when a stream being passed by the agent stops sending voice for more than a predetermined idle time.

5. The method of claim 4, further comprising in the agent the steps of:

when in the Idle Mode, monitoring all possible streams to detect a non-silent stream;

after detecting a non-silent stream, entering a convergence period having a predetermined convergence duration;

when a first detected stream comes from the device associated with the agent, entering a "Converge-Talk Mode"; and when the first detected stream is intended for the device associated with the agent, entering a "Converge-Listen Mode".

6. The method of claim 4, further comprising in the agent the step of when a plurality of non-silent streams are detected after entering the Idle Mode, selecting one of the streams based upon the following rules:

when the non-silent streams are a talk stream and a listen stream, selecting the listen stream; and when the non-silent streams comprise a plurality of listen streams, selecting the listen stream having a highest priority, based upon the source identifiers.

7. The method of claim 5, further comprising in the agent, when in the Converge-Listen Mode, the steps of:

blocking the talk stream from the device while a currently selected listen stream towards the device is present;

continuously looking for new listen streams;

when finding a new listen stream, comparing its priority with that of the currently selected listen stream, based upon the source identifiers; and if the priority of the new listen stream is higher, switching to the new listen stream.

8. The method of claim 5, further comprising in the agent, when in the Converge-Listen Mode, the steps of:

monitoring how long the agent has been in the Converge-Listen Mode; and entering the Listen Mode when the agent has been in the Converge-Listen Mode for the predetermined convergence duration.

9. The method of claim 5, further comprising in the agent, when in the Converge-Talk Mode, the steps of:

continuously looking for new listen streams towards the device;

when finding a new listen stream, comparing its priority with that of the talk stream from the device, based upon the source identifiers; and if the priority of the new listen stream is higher, switching to the new listen stream and transitioning to the Converge-Listen Mode.

10. The method of claim 5, further comprising in the agent, when in the Converge-Talk Mode, the steps of:

monitoring how long the agent has been in the Converge-Talk Mode; and entering the Talk Mode when the agent has been in the Converge-Talk Mode for the predetermined convergence duration.

11. An apparatus in a network for distributed arbitration of a right to speak among a plurality of devices participating in a real-time voice conference through the network via multimedia data packets having source identifiers, the apparatus comprising:

a device interface for communicating with a device of the plurality of devices;

a network interface for communicating with other devices through the network; and a processor coupled to the device interface and coupled to the network interface for controlling communications through the device interface and the network interface, wherein the processor is programmed to:

act as an agent associated with the device for arbitrating between a talk stream generated by the device and a listen stream intended for the device and generated by another device on the network;

define in the agent a "Talk Mode" in which the agent passes the talk stream from the device to the other devices participating in the conference while blocking all listen streams intended for the device, and a "Listen Mode" in which the agent blocks the talk stream of the device from the network and passes a single listen stream from the network to the device; and make a decision to enter one of the Talk Mode and the Listen Mode, wherein the decision is based upon a presence of at least one of the talk stream and the listen stream, and wherein the decision is further based upon a comparison of the source identifiers of the talk and listen streams when required to resolve a conflict.

12. The apparatus of claim 11, wherein the device is a mobile telephone, and wherein the network is a mobile telephone infrastructure coupled wirelessly with the mobile telephone.

13. The apparatus of claim 11, wherein the device is arranged and programmed to:
   perform an arbitration of a right to speak for a plurality of separate devices;
   provide a single talk stream into the agent; and
   receive a single listen stream from the agent.

14. The apparatus of claim 11, wherein the processor is further programmed to control the agent to
   enter an "Idle Mode" when a stream being passed by the agent stops sending voice for more than a predetermined idle time.

15. The apparatus of claim 14, wherein the processor is further programmed to control the agent to:
   when in the Idle Mode, monitor all possible streams to detect a non-silent stream;
   after detecting a non-silent stream, enter a convergence period having a predetermined convergence duration;
   when a first detected stream comes from the device associated with the agent, enter a "Converge-Talk Mode";
   when the first detected stream is intended for the device associated with the agent, enter a "Converge-Listen Mode".

16. The apparatus of claim 14, wherein the processor is further programmed to control the agent to
   when a plurality of non-silent streams are detected after entering the Idle Mode, select one of the streams based upon the following rules:
      when the non-silent streams are a talk stream and a listen stream, select the listen stream; and
      when the non-silent streams comprise a plurality of listen streams, select the listen stream having a highest priority, based upon the source identifiers.

17. The apparatus of claim 15, wherein the processor is further programmed to control the agent to, when in the Converge-Listen Mode:
   block the talk stream from the device while a currently selected listen stream towards the device is present;
   continuously look for new listen streams;
   when finding a new listen stream, compare its priority with that of the currently selected listen stream, based upon the source identifiers; and
   if the priority of the new listen stream is higher, switch to the new listen stream.

18. The apparatus of claim 15, wherein the processor is further programmed to control the agent to, when in the Converge-Listen Mode:
   monitor how long the agent has been in the Converge-Listen Mode; and
   enter the Listen Mode when the agent has been in the Converge-Listen Mode for the predetermined convergence duration.

19. The apparatus of claim 15, wherein the processor is further programmed to control the agent to, when in the Converge-Talk Mode:
   continuously look for new listen streams towards the device;
   when finding a new listen stream, compare its priority with that of the talk stream from the device, based upon the source identifiers; and
   if the priority of the new listen stream is higher, switch to the new listen stream and transition to the Converge-Listen Mode.

20. The apparatus of claim 15, wherein the processor is further programmed to control the agent to, when in the Converge-Talk Mode:
   monitor how long the agent has been in the Converge-Talk Mode; and
   enter the Talk Mode when the agent has been in the Converge-Talk Mode for the predetermined convergence duration.

21. A method for distributed arbitration of a right to speak among a plurality of devices participating in a real-time voice conference through a network via multimedia data packets having source identifiers, the method comprising the steps of:
   associating an agent with each of the plurality of devices for arbitrating between a talk stream generated by the device and a listen stream intended for the device and generated by another device on the network;
   defining in the agent a "Converge-Talk Mode" in which the agent provisionally passes the talk stream from the device to other devices participating in the conference while blocking all listen streams intended for the device, and a "Converge-Listen Mode" in which the agent blocks the talk stream of the device from the network and passes a single listen stream from the network to the device; and
   making a decision, by the agent, to enter one of the Converge-Talk Mode and the Converge-Listen Mode, wherein the decision is based upon a presence of at least one of the talk stream and the listen stream, and wherein the decision is further based upon a comparison of the source identifiers of the talk and listen streams when required to resolve a conflict.

22. The method of claim 21, further comprising in the agent the step of:
   entering an "Idle Mode" when a stream being passed by the agent stops sending voice for more than a predetermined idle time.

23. The method of claim 21, further comprising in the agent the steps of:
   when in an Idle Mode, monitoring all possible streams to detect a non-silent stream;
   when a first detected stream comes from the device associated with the agent, entering the Converge-Talk Mode; and
   when the first detected stream is intended for the device associated with the agent, entering the Converge-Listen Mode.

24. The method of claim 21, further comprising in the agent, when in the Converge-Talk Mode, the steps of:
   continuously looking for new listen streams towards the device;
   when finding a new listen stream, comparing its priority with that of the talk stream from the device, based upon the source identifiers; and
   if the priority of the new listen stream is higher, switching to the new listen stream and transitioning to the Converge-Listen Mode.

25. The method of claim 21, further comprising in the agent, when in the Converge-Listen Mode, the steps of:
   blocking the talk stream from the device while a currently selected listen stream towards the device is present;
   continuously looking for new listen streams;
   when finding a new listen stream, comparing its priority with that of the currently selected listen stream, based upon the source identifiers; and
   if the priority of the new listen stream is higher, switching to the new listen stream.

* * * * *